United States Patent Office 3,425,541
Patented Feb. 4, 1969

3,425,541
PACKAGE AND A METHOD FOR EXPOSING
ITS CONTENTS
William A. Patterson, Spartanburg, S.C., assignor
to W. R. Grace & Co., Duncan, S.C., a corporation of Connecticut
No Drawing. Continuation-in-part of application Ser. No.
359,506, Apr. 13, 1964. This application Dec. 3, 1964,
Ser. No. 415,812
U.S. Cl. 206—46                                    14 Claims
Int. Cl. B65d 85/00; B65b 43/00; C08f This is a continuation-in-part application of my copending application, Ser. No. 359,506, filed Apr. 13, 1964.

This invention relates to a package. In one aspect the invention relates to an article enclosed in a solvent shrinkable film. In another aspect the invention relates to the removal of said article from said enclosing film.

It is well known that crystalline thermoplastic materials, such as polyethylene, polyvinyls and the like, may be highly oriented by stretching to produce a material which has a built-in memory so that upon the application of heat the oriented polymer, if not restrained, will return to its original dimensions. However, quite elevated temperatures (frequently above 212° F.) must normally be employed for the shrinking operation so that the application of the technique is limited to the packaging, etc., of items that are not damaged by exposure to elevated temperatures.

In addition, a number of polymers are limited in their applications because they are highly soluble in common solvents such as water. Examples of these are the polyethers including polymeric vinyl ethers and the polyalkylene oxides. The polyvinyl ethers are generally soft and tacky and have found utility as adhesives, but are generally not suitable for the manufacture of films. The polyalkylene oxides can be made into film but are water sensitive. Polyalkylene oxide, for example, is useful as a humectant, thickener, or softener, and is normally unsuitable for films or molded objects. Some of the higher polyalkylene oxides, such as polytetramethylene oxide, are more rigid and useful in moldings.

In my copending application Ser. No. 359,506 I have described a treated polymer film based on these polymers which possesses high shrink energy. A unique property of these crosslinked films is their ability to shrink rapidly upon contact with a material which prior to treatment would have dissolved the polymer.

The object of the invention is to provide a package.

Yet another object is to provide a package having a form-fitting film enclosing an article.

Another object of the invention is to provide a method for exposing an article enclosed in a form-fitting film.

These and other objects of the invention will be readily apparent to those skilled in the art from the following discussion and appended claims.

It has now been found that these treated polymeric films are especially useful in packaging a product or article since it also provides a valuable means for removing the article or product from the enclosing film. If the article is tightly enclosed in said film so as to closely conform to the contours of the article, it may be stored indefinitely for sale or the like under normal indoor storage conditions. However, if the enclosing film is then contacted with a solvent, as hereinbefore described, the high shrink energy of the film results in the film literally tearing itself apart and thereby exposing the contents of the package.

The invention is broadly applicable to the use of shrinking polymeric films having high shrink energies. Particularly useful are those "solvent" shrinkable films described in my copending application.

It has been found that organic, thermoplastic, normally solid, polymeric materials which are generally highly soluble in solvents at ambient temperatures are generally less soluble in the same solvent after irradiation with accelerated electrons. Any suitable method may be used for reducing solubility such as the formation of association complexes by reaction with certain compounds such as phenolic resins, mineral acids, halogens, urea, lignin sulfonic acids and polycarboxylic containing compounds; however, irradiation is preferred.

Further and more surprisingly, the orientation of the irradiated material produces a film or filament which possesses considerable shrink energy upon contact with the solvent. The polymer may also be oriented prior to reducing its solubility.

As employed herein the term "solvent shrinkable polymer" refers to a polymer normally soluble in a solvent at ambient temperatures and atmosphere pressure, said polymer having been treated, such as by irradiation, so as to reduce its solubility and molecularly oriented to provide high shrink energies in the direction of orientation. The term "solvent" refers to the material which will dissolve only a small amount of the treated polymer.

Particularly preferred are the organic polyethers having recurring chains at least 2 carbon atoms long. The preferred polyethers are characterized by the recurring structural unit —$(C_nH_{2n}O)$— where $n$ is a plural integer of not more than 10 and usually between 2 and 8. Such polymers are hydrocarbon except for the ether oxygen and are generally initially substantially non-rubbery and non-elastic at ordinary conditions of temperature. The invention is not to be limited to polyethers. Other suitable polymers are the sarans (vinylidene chloride-vinyl chloride copolymers) which have been crosslinked so they are solvent shrinkable in solvents such as tetrahydrofuran. A suitable method for producing these polymers is disclosed in Ser. No. 157,194, commonly assigned, which discloses extruding a three ply laminate (middle ply being saran), irradiating the laminate and orienting. The only requirements are that the polymer is highly soluble in a solvent, its solubility can be reduced such as by irradiation, and it can be highly oriented to provide a solvent shrinkable polymer.

Suitable polymers include the polyalkylene oxides with the recurring unit —$(CH_2)_n$—O— wherein $n$ is a plural integer of up to 4. Examples of these polyethers are polyethylene oxide and polytetramethylene oxide. A further class of hydrocarbon ethers are the polyvinyl ethers which have the unit.

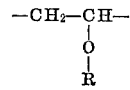

wherein R is a radical, generally hydrocarbon and preferably alkyl, of usually up to 8 carbons. Examples of such ethers are polymers of methyl vinyl ether, isopropyl vinyl ether, and 2-ethylhexyl vinyl ether. The preferred polymer is polyethylene oxide.

Although it is known that irradiation of a polymer will generally decrease the solubility of the polymer, it was most surprising to discover that the irradiated polymer, if oriented, possesses high shrink energy if contacted with a solvent for the non-irradiated material. The mechanism of this phenomenon is not known. However, it has been theorized that an oriented crystalline material shrinks upon the application of heat because the crystals melt, thereby releasing the locked-in molecules and permitting them to return to their more natural position. Perhaps the solvent performs the same function as heat—that is, the solvent dissolves the crystals instead of melting them. On the other hand, the rapidity of shrink on thin films is so rapid that it is difficult to believe the solvents can dissolve crystallites so quickly. Therefore, these results are all the more surprising. Obviously, this phenomenon is of no use on a highly soluble material because it will simply dissolve. However, if the solubility is first decreased, such as by irradiation, then only a small portion of the crystalline material will dissolve leaving a useful material. The invention is all the more useful if the temperature of the solvent is low so that it is not necessary to exceed the crystalline melting point.

The crystalline melting point, i.e., temperature at which the crystalline nature of the polymer is destroyed or the transition temperature of the crystalline to the amorphous state, is readily determined by known methods. It is the temperature at or above which birefringence no longer occurs, and X-ray diffraction patterns indicate an amorphous structure (see, e.g., Weissberger, "Physical Methods in Organic Chemistry," Interscience, 1949, pages 885–6 and 1080–1). For the polymeric ethers, the crystalline melting point of the solid polymer is at least 35° C. and usually 35–100° C.

The crystalline polyethers are generally highly soluble at room temperature or thereabouts in common solvents including acetic acid, acetonitrile, chloroform, ethylene dichloride, isopropanol, methylene dichloride, carbon tetrachloride, benzene, dimethyl formamide, tetrahydrofuran, ethylene carbonate, methanol, methyl ethyl ketone, and water. The preferred solvent for polyethylene oxide herein is water.

The polymers are preferably employed as an elongated member, such as a film or filament formed by extruding the molten polymer through a die. For simplicity the invention is described with reference to a film. After formation of the film and cooling of same to solidify, it is subjected to irradiation by any suitable means such as disclosed in the patent to Baird et al., U.S. Patent No. 3,022,543, and Rainer et al., U.S. Patent No. 2,877,500. The polymer is subjected to sufficient dosage to reduce the solubility of the polymer in the solvent to be employed in the subsequent shrink operation. The dosage depends on the molecular weight and the structure of the molecule. Preferably the polymer is irradiated at a dosage of at least 1, more preferably 2 to 20 megarads.

A REP as recognized in the art is defined as that amount of nuclear irradiation which dissipates 93 ergs of energy per gram of tissue producing $1.61 \times 10^{12}$ ion pairs in the process. An alternative unit is the Rad which is defined as representing 100 ergs of energy per gram imparted by ionizing particles to the irradiated material at the point of interest.

The polymer is generally subjected to irradiation at ambient temperatures with the reduction in solubility proceeding more rapidly at elevated temperature; however, the temperature is less than the crystalline melt point, more preferably less than 90° F. for polyethylene oxide.

The film or filament may be of any suitable dimension so long as the irradiation is effective for reducing solubility of the polymer unit.

Irradiation can be accomplished by various methods. Thus, there can be used electrons, X-rays, gamma rays by employing iron 59 or cobalt 60, beta-rays, e.g., by employing cobalt 60, carbon 14, phosphorus 32, strontium 90, and ultra-violet light. Preferably, electrons of at least $10^5$ electron volts energy are employed. A suitable irradiation source is a Van de Graaff type electron accelerator manufactured by the High Voltage Engineering Corporation, Burlington, Mass., operated at 2,000,000 volts and a power output of 500 watts. Alternatively, there can be employed other sources of high energy electrons, such as the General Electric 2,000,000 volt, 10 kw., resonant transformer unit or the corresponding 1,000,000 volt, 5 kw., General Electric resonant transformer of a linear accelerator.

The time of irradiation is not critical but need merely be sufficient to give a dosage of sufficient rep. The voltage, likewise, can be varied quite widely, but for rapid irradiation of thick or multi-layer materials, is desirably high, e.g., 500,000 or 1,000,000 or 2,000,000 or 3,000,000 or even higher. By appropriate combination of time of treatment, voltage and beam current, the desired dosage is obtained.

Subsequent to the irradiation of the polymeric member (although irradiation may take place after orientation), it is oriented monoaxially or biaxially or omniaxially by any suitable means such as by stretching or by inflating. The invention is not limited to any particular method of orientation. Orientation is discussed herein with reference to biaxial orientation (actually omniaxially oriented) wherein the molten polymer is extruded through an annular die to form a tube which is solidified. The tube or tape is then inflated by air pressure or any suitable fluid, thereby biaxially orienting the polymer. The resulting bubble is deflated to form a flattened tubing or tape which may be slit to form a film.

The pressures for the formation of bubbles for the oriented materials are within the skill of the art, and the invention is not so limited.

Surprisingly, it has been found that this oriented, irradiated material may be shrunk merely by contacting it with a solvent. For example, a film of polyethylene oxide in an oriented state may be immersed in a water bath at approximately room temperature and considerable shrink force will develop immediately. Any solvent may be employed which is a solvent for the non-irradiated material, but which will not dissolve any substantial portion of the irradiated material. In the case of water, non-irradiated polyethylene oxide is soluble. It has been found that a suitable irradiated polyethylene oxide is one that has an increased insoluble content, preferably not less than 30%, even more preferably 50 to 90%.

Insoluble content refers to the non-extractable portion of the irradiated oriented polymer in benzene. Insolubility is determined by weighing the sample, extracting in benzene for 20 hours at its boiling point in apparatus designed for ASTM D–147. The benzene insoluble portion is dried at reduced pressure in a vacuum oven at 55–60° C. for no less than 38 hours.

Since there is a three dimensional network, there is little difference in solubility of a given polymer in a specific solvent so long as sufficient solvent is used to insure that saturation has not occurred. Thus, the insolubility of the polymer in water is essentially the same as its insolubility in benzene. The irradiated oriented material will shrink to about its dimensions prior to orientation, or to at least within 125% of its original dimensions. An inch strip of about 1 mil thick oriented polymer preferably has a shrink energy of at least 0.1 lb., preferably 0.2–1.0 lb.

Shrink energy is the force of contraction at a given temperature when the material is restrained. More specifically, it is the measurable tension in a fully monodirectionally restrained strip of film when the film is heated to the specified temperature (e.g., 96° C.). Shrink energy is determined herein by measuring the force exerted by a 1 inch wide strip mounted between two arms of a holder, one arm of which is stationary and the other is connected to an electronic strain gauge.

The article or product to be enclosed by the film is not limitative so long as it is not incompatible with the film. Generally, it is a solid, either particulate or unitary, although a liquid or even a gas could be contained within the film so long as it is properly sealed. The article is enclosed within the film by any suitable means. Preferably the film completely encloses the article and is suitably sealed. However, a tubing or the like enclosing a major portion of the article is also within the scope of the invention. The film must tightly enclose the article so as to closely conform to the contours of the article. The tightness of the film must be sufficient so that subsequent shrinkage of the film will result in rupturing of the film.

A particularly suitable technique is to wrap the film about the article, heat seal the overlapped edges and then shrink the film to a skin tight fitting. Removal of air is not necessary since it is only necessary to create tension on the film. The first shrinking step can be by heat or solvent, preferably by subjecting the package to heat shrinking temperatures for a period of time sufficient only to form the skin tight film. For treated polyethylene oxide, suitable conditions are 150 to 200° F. for 0.1 to 1.0 second depending on tightness desired. The package is then contacted with a solvent. The shrink energy of these films is so great that the film ruptures, thus exposing the contents of the package.

Preferably the solvent shrinking operation takes place at a temperature less than that at which significant shrinkage occurs due to temperature, e.g., 32° F. to 150° F., more preferably at ambient room temperature in the range of 50° F. to 90° F.

The invention has particular utility in the formation of packages from which the contents must be instantly removable. For example, seeds and fertilizer can be stored in individual packages which, when deposited in the ground, will rupture upon contact with water thus releasing the seeds and fertilizer in their proper environment. Indeed the film will assist by storing considerable amounts of water in the vicinity of the seed until bacterial action or other decomposing phenomena destroy the polymer.

The polymers may include additives such as stabilizers, antislip agents, antistatic agents, fillers, pigments and the like.

The invention is best illustrated by the following examples:

Example I

Capsules were prepared consisting of 0.125 ounce of vermiculite, 0.125 ounce of a fertilizer [1] and/or seeds in a small bag made from film of a high molecular weight polymer of polyethylene oxide [2] which had been irradiated to 4 mr. The film had been biaxially oriented about 300% in each direction to form a water-shrinkable film. The overlapping edges were heat sealed to form a capsule about the size of a Life-Saver package, about ½ inch in diameter by 2 inches long.

A capsule prepared as above was immersed in water. In about 15 seconds the film ruptured.

Although this would be quite satisfactory for many applications, a speedier response might also be desirable.

Example II

A capsule prepared as above was subjected to the action of a hot air gun thereby shrinking the film to form a very tight package. Upon being immersed in a beaker of water, the film almost instantly split open, that is in one or two seconds, thereby exposing its contents.

Similar results were attained with polymer films irradiated from 4 to 11 mr.

I claim:

1. A package comprising an article enclosed within a solvent-shrinkable, cross linked, organic polyether film closely conforming to the contours of said article.

2. A package comprising an article enclosed in a film closely conforming to the contours of said article, said film comprising an irradiated, biaxially oriented polyalkalene oxide.

3. The package of claim 2 wherein said film comprises polyethylene oxide which is at least 30% insoluble in boiling benzene.

4. A package comprising an article enclosed in a film closely conforming to the contours of said article, said film comprising an irradiated, biaxially oriented polyethylene oxide having a shrink energy of at least about 0.1 lb. and which is 50–90% insoluble in boiling benzene.

5. The package of claim 4 wherein said film is shrinkable upon contact with water and has sufficient shrink energy to rupture and expose at least a portion of said article.

6. A method of exposing the contents of a package comprising:
   (a) enclosing an article in a film which closely conforms to the contours of said article, said film comprising a solvent-shrinkable, irradiated, biaxially oriented polyalkalene oxide,
   (b) subjecting said film to a solvent which shrinks said film with sufficient force to rupture it and thereby expose the contents.

7. The method of claim 6 wherein said polyalkylene oxide comprises polyethylene oxide having a shrink energy of at least about 0.1 lb. and which is 50–90% insoluble in boiling benzene.

8. The method of claim 7 wherein said solvent comprises water.

9. The method of exposing the contents of a package comprising:
   (a) enclosing an article in a solvent-shrinkable, cross linked, organic polyether film,
   (b) partially heat shrinking said film so as to closely conform the film to the contours of said article, and
   (c) subsequently subjecting said partially shrunk film to additional shrinking sufficient to rupture said film and expose said article by contacting said film with a solvent.

10. A method of exposing the contents of a package comprising:
    (a) enclosing an article in an irradiated, biaxially oriented polyalkylene oxide film,
    (b) partially heat shrinking said film so as to closely conform the film to the contours of said article,
    (c) and subsequently solvent shrinking said film sufficient to rupture said film and expose said article.

11. The method of claim 10 wherein said film comprises polyethylene oxide.

12. The method of claim 11 wherein said solvent comprises water.

13. A method of exposing the contents of a package comprising:
    (a) forming a package by enclosing an article in a film comprising a water and heat shrinkable, irradiated, biaxially oriented polyethylene oxide,
    (b) partially shrinking said film about said article by subjecting said film to a heat shrinking temperature for a period of time sufficient to cause said film to closely conform to the contours of said article,
    (c) discontinuing the application of heat,
    (d) subsequently contacting said film with water at a temperature below that which causes any substantial heat shrinkage to cause additional shrinkage of said film sufficient to rupture said film and expose said article.

14. The method of claim 13 wherein said water is at substantially room temperature.

References Cited

UNITED STATES PATENTS 1,969,453    8/1934    Churchill.

MARTHA L. RICE, *Primary Examiner.*

U.S. Cl. X.R.

53—30; 204—159.14

---

[1] Mag Amp R, Davison Chemical Division, W. R. Grace & Co.
[2] WSR–301, Union Carbide Corp., 30 E. 42nd St., New York, N.Y., a high molecular weight aqueous solution of polyethylene oxide (1% concentration) having a viscosity in the range of 2000–4000 centipoises at 25° C. using a Brookfield Viscometer RVF at 2 r.p.m. with the largest spindle. The melt viscosity was about 100,000–110,000 poises at 150° C.